(12) United States Patent
Subrahmanya

(10) Patent No.: US 8,687,588 B2
(45) Date of Patent: Apr. 1, 2014

(54) LOW POWER MODES FOR FEMTO CELLS

(75) Inventor: Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 12/483,652

(22) Filed: Jun. 12, 2009

(65) Prior Publication Data
US 2010/0002614 A1    Jan. 7, 2010

Related U.S. Application Data

(60) Provisional application No. 61/077,533, filed on Jul. 2, 2008.

(51) Int. Cl.
    *H04W 4/00*        (2009.01)

(52) U.S. Cl.
    USPC .......................................................... 370/331

(58) Field of Classification Search
    USPC ......................................... 370/331, 318, 311
    See application file for complete search history.

(56) References Cited

U.S. PATENT DOCUMENTS

| | | | | |
|---|---|---|---|---|
| 6,577,608 | B1 * | 6/2003 | Moon et al. | 370/311 |
| 6,694,517 | B1 * | 2/2004 | James et al. | 725/127 |
| 6,816,977 | B2 * | 11/2004 | Brakmo et al. | 713/323 |
| 6,934,539 | B2 * | 8/2005 | Laroia et al. | 455/421 |
| 2005/0053047 | A1 * | 3/2005 | Osterloh et al. | 370/344 |
| 2005/0154933 | A1 * | 7/2005 | Hsu et al. | 713/320 |
| 2007/0066273 | A1 * | 3/2007 | Laroia et al. | 455/343.2 |
| 2008/0305835 | A1 * | 12/2008 | Johnstone et al. | 455/561 |
| 2009/0288139 | A1 * | 11/2009 | Huber et al. | 726/2 |

FOREIGN PATENT DOCUMENTS

| | | |
|---|---|---|
| EP | 2056628 A1 | 5/2009 |
| JP | 2000261844 A | 9/2000 |
| JP | 2001054157 A | 2/2001 |
| JP | 2001156788 A | 6/2001 |
| JP | 2002204470 A | 7/2002 |
| JP | 2006287601 A | 10/2006 |
| JP | 2006352477 A | 12/2006 |
| JP | 2007170566 A | 7/2007 |
| JP | 2008109423 A | 5/2008 |
| JP | 2009510835 A | 3/2009 |
| RU | 2264036 | 11/2005 |
| WO | 0176098 A2 | 10/2001 |
| WO | 2007035447 | 3/2007 |
| WO | WO2008136416 | 11/2008 |

OTHER PUBLICATIONS

International Search Report and Written Opinion—PCT/US2009/049404, International Search Authority—European Patent Office—Oct. 29, 2009.

(Continued)

*Primary Examiner* — Mark Rinehart
*Assistant Examiner* — Mohammad Anwar
(74) *Attorney, Agent, or Firm* — Ashish L. Patel

(57) ABSTRACT

Devices and methods are provided for deploying and/or implementing a low power mode in an access point (AP) base station. The low power mode may be implemented based on the presence and/or status of access terminals (ATs). In one embodiment, the method may involve determining whether any ATs are present within at least one defined coverage area. In another embodiment, the method may involve determining whether the ATs are in an idle or active state.

37 Claims, 16 Drawing Sheets

(56) References Cited

OTHER PUBLICATIONS

Siemens AG et al., "A method for interference control and power saving for home access point" IP.com Journal, IP.c0m Inc., West Henrietta, NY, US, Dec. 13, 2007, XP013122942 ISSN: 1533-0001 the whole document.

Taiwan Search Report—TW098122282—TIPO—Sep. 25, 2012.

\* cited by examiner

LOW POWER MODES FOR FEMTO CELLS

CLAIM OF PRIORITY UNDER 35 U.S.C. §119

The present Application for Patent claims priority to Provisional Application No. 61/077,533 entitled "LOW POWER MODES FOR FEMTOCELLS" filed Jul. 2, 2008, and assigned to the assignee hereof and hereby expressly incorporated by reference herein.

BACKGROUND

1. Field

The present application relates to wireless communication devices, and more particularly, to systems and methods for implementing low power modes for femto cells.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices. In addition to mobile phone networks currently in place, a new class of small base stations has emerged, which may be installed in residential or business locations to provide indoor wireless coverage to mobile units using existing broadband internet connections. Such personal miniature base stations are generally known as an access point (AP) base station, also referred to as Home Node B (HNB) unit, femto cell, femto base station (fBS), base station, or base station transceiver system (BTS). Typically, such miniature base stations are connected to the internet and the mobile operator's network via a digital subscriber line (DSL) router or cable modem.

AP base stations or femto cells allow for cellular access where base station support is weak or unavailable (e.g., indoors, remote locations, and the like). AP base stations may be described as small base stations that connect to wireless service providers via a broadband backhaul link, such as DSL, cable internet access, T1/T3, etc., and offer typical base station functionality, such as base transceiver station (BTS) technology, radio network controller, and gateway support node services. This allows an access terminal (AT), also referred to as a cellular/mobile device or handset, or user equipment (UE), to connect to the AP base stations and utilize the wireless service. It is noted that ATs can include, for example, cellular phones, smart phones, laptops, handheld communication devices, handheld computing devices, satellite radios, navigational devices, personal digital assistants (PDAs), and/or any other suitable device for communicating over a wireless communication system.

There will sometimes be extended periods of time when (a) there are no ATs within the coverage area(s) associated with a given AP base station, and/or (b) each of the ATs is in an idle state. In such circumstances, if the given AP base station transmits at a high power, the given AP base station will be wasting electric power, and may be causing unnecessary interference to users being served by neighboring AP base stations and/or macro base stations. Accordingly, it would be desirable to provide a technique for AP base stations to selectively reduce transmit power, while at the same time transmitting those signals necessary for ATs to detect the presence of the AP base stations and receive pages in their assigned wake-up cycles.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for deployment of a low power mode in an access point (AP) base station. In one embodiment, the method may involve determining whether any access terminals (ATs) are present within at least one defined coverage area. The method may involve, in response to no ATs being within the at least one coverage area, entering the low power mode. The method may also involve, when in the low power mode, varying a transmission power at which the AP base station transmits at least one common channel (e.g., at least one of a synchronization channel, a pilot signal, and a broadcast channel) as a function of time.

In related aspects, the step of determining may comprise determining whether at least one AT is present within a femto coverage area of the AP base station. The step of varying may comprise varying the transmission power of at least one of a synchronization channel, a pilot signal, and a broadcast channel.

In further related aspects, the step of determining may comprise receiving mobility data regarding at least one AT as determined by a macro network. In the alternative, or in addition, the step of determining may comprise receiving information regarding whether at least one AT is present within a macro coverage area of a macro base station of a macro network. In the alternative, or in addition, the step of determining may comprise aggregating information regarding at least one AT from a plurality of macro base stations of a macro network.

In yet further related aspects, the step of receiving the information may comprise receiving a wake-up signal transmitted from the macro network. The method may involve receiving the wake-up signal based at least in part on identification of at least one of a serving cell and a neighboring cell reported by the at least one AT. The method may also involve receiving the wake-up signal based at least in part on mobility data regarding the at least one AT as determined by the macro network. The method may further involve ceasing to operate in the low power mode in response to receiving the wake-up signal, and/or modifying (e.g. increasing) the transmission power in response to receiving the wake-up signal.

In still further related aspects, the method may involve: in response to at least one AT being within the at least one coverage area, determining whether each of the at least one AT is an idle state; and in response to each of the at least one AT being in the idle state, entering a second low power mode. The method may involve, in response to a given one of the at least one AT being in an awake state, operating in a normal mode.

In another embodiment, the method may involve determining whether each of at least one AT in at least one defined coverage area is in an idle state. The method may involve, in response to each of the at least one AT being in the idle state, entering the low power mode. The method may also involve varying a transmission power at which the AP base station transmits at least one common channel as a function of time. The method may further involve, in response to a given one of the at least one AT being in an awake state, operating in a normal mode.

In accordance with one or more embodiments and corresponding disclosure thereof, various aspects are described in connection with devices and apparatuses configured for deployment of a low power mode. In one example, the device may include a backhaul interface for a communication backhaul in operative communication with a macro network. The device may include a transceiver module for communicating with at least one of (a) at least one AT, (b) the macro network via the backhaul, and (c) at least one base station (e.g., at least one of a macro base station and a neighboring AP base station) in operative communication with the macro network. The device may also include at least one processor operatively coupled with the backhaul interface and the transceiver module. The device may further include a memory module operatively coupled with the at least one processor and comprising executable code for the at least one processor.

In one embodiment, the at least one processor may: (a) determine whether any ATs are present within at least one defined coverage area; (b) in response to no ATs being within the at least one coverage area, place the device in a low power mode; and (c) when the device is in the low power mode, instruct the transceiver module to vary a transmission power at which the transceiver module transmits at least one common channel (e.g., at least one of a synchronization channel, a pilot signal, and a broadcast channel) as a function of time.

In related aspects, the at least one coverage area comprises a femto coverage area of an AP base station. In the alternative, or in addition, the at least one coverage area may comprise a macro coverage area of a macro base station of the macro network. The at least one processor may determine whether any ATs are present within the at least one coverage by receiving mobility data regarding the at least one AT as determined by a macro network. The at least one processor may determine whether any ATs are present within the at least one coverage area by aggregating information regarding the at least one AT from a plurality of macro base stations of a macro network.

In further related aspects, the transceiver module may receive a wake-up signal transmitted from the macro network. The wake-up signal may be based at least in part on identification of at least one of a serving cell and a neighboring cell reported by the at least one AT. The wake-up signal may be based at least in part on mobility data regarding the at least one AT as determined by the macro network. The device may cease to operate in the low power mode in response to receiving the wake-up signal. The at least one processor may instruct the transceiver module to modify (e.g., increase) the transmission power in response to receiving the wake-up signal.

In yet further related aspects, the at least one processor may: in response to the at least one AT being within the at least one coverage area, determine whether each of the at least one AT is an idle state; and, in response to each of the at least one AT being in the idle state, place the device in a second low power mode. The at least one processor may place the device in a normal mode, in response to a given one of the at least one AT being in an awake state.

In another embodiment, the at least one processor may: (a) determine whether each of at least one AT in at least one defined coverage area is an idle state; (b) in response to each of the at least one AT being in the idle state, place the device in a low power mode; and (c) when the device is in the low power mode, instruct the transceiver module to vary a transmission power at which the transceiver module transmits at least one common channel as a function of time. The at least one processor may, in response to a given one of the at least one AT being in an awake state, place the device in a normal mode.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
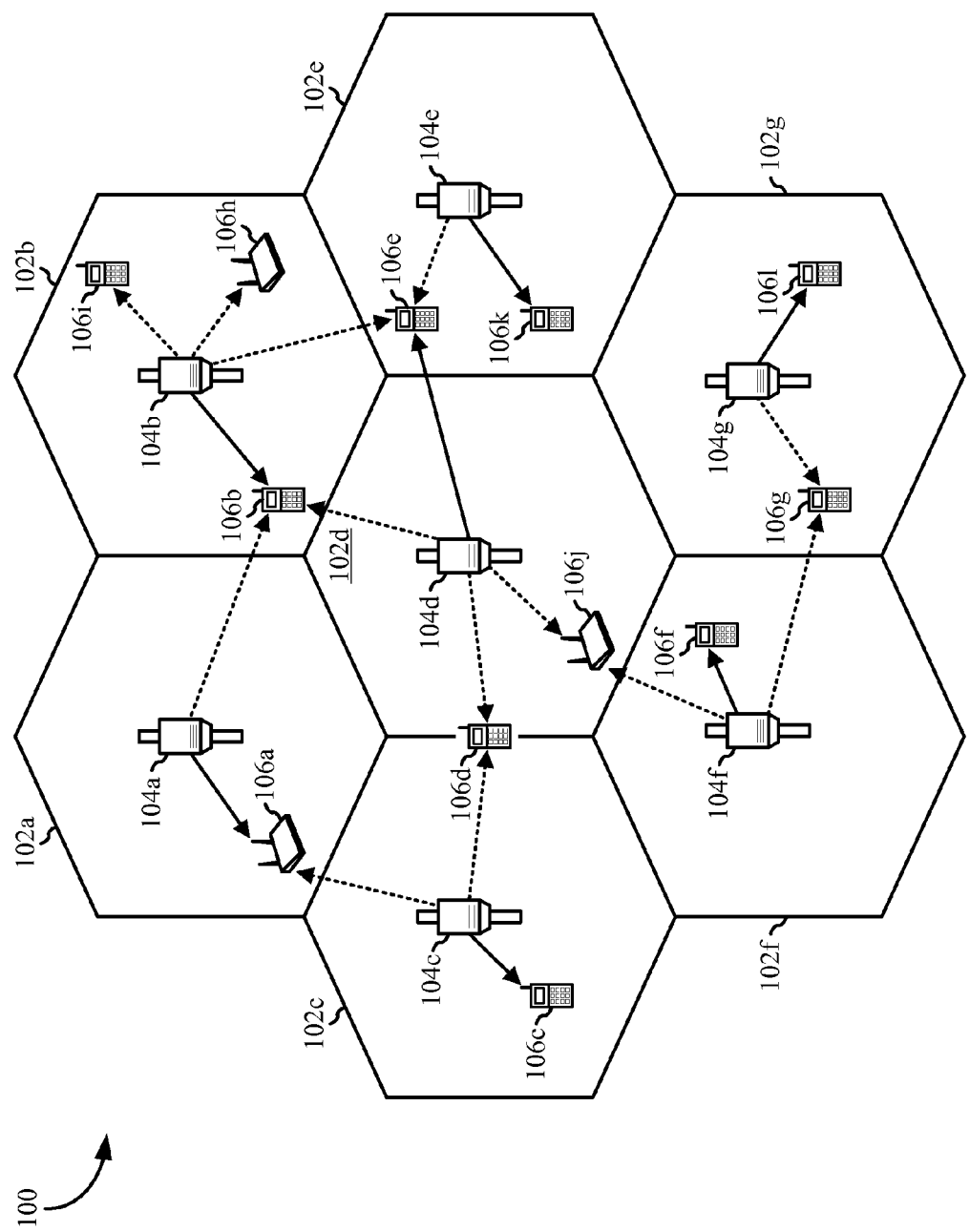
FIG. 1 illustrates an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Access point (AP) base stations can be deployed to individual consumers and placed in homes, apartment buildings, office buildings, and the like. An AP base station can communicate wirelessly with an AT in range of the AP base station utilizing a licensed cellular transmission band. Further, AP base stations may be connected to a core cellular network by way of an Internet Protocol (IP) connection, such as a Digital Subscriber Line (DSL, e.g., including Asymmetric DSL (ADSL), High data rate DSL (HDSL), Very high speed DSL (VDSL), etc.), a TV cable carrying IP traffic, a Broadband over Power Line (BPL) connection, or like connection. The connection between the IP line and the cellular network can be a direct connection, or by way of the internet. An AP base station, therefore, can provide cellular support to an AT or cellular handset and route cellular traffic (e.g., voice, data, video, audio, internet, etc.) to a macro cellular network through the IP connection. This mechanism can save consumers air time costs and reduce a network provider's cellular network traffic load. Also, cellular coverage inside a home, office building, apartment, etc. can be greatly improved via implementation of AP base stations. It is noted that the AP base station can communicate with the core cellular network by way of a non-IP connection that implements Asynchronous Transfer Mode (ATM) or the like.

Although an AP base station is capable of forming a cellular link (e.g., a wireless link utilizing one or more licensed radio network frequencies) with multiple ATs, a consumer typically desires only his or her own traffic to be carried by a private IP connection connected to the AP base station. For instance, consumers may wish to preserve IP bandwidth for their own use, rather than for the use of other AT users. As a result, in certain deployments, an AP base station may be associated with a single AT or group of ATs, and traffic related to such AT(s) is routed over the consumer's IP connection, whereas traffic related to other ATs may have a lower priority or be blocked. Consequently, although the AP base station can communicate with multiple ATs regardless of subscriber, the AP base station is typically programmed to ignore devices that are not associated with a particular consumer, service plan, or the like.

FIG. 1 illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding macro base station 104 (such as base stations 104a-104g). Each cell may be further divided into one or more sectors. Various access terminals (ATs) 106, including ATs 106a-106k, also known interchangeably as user equipment (UE), are dispersed throughout the system. Each AT 106 may communicate with one or more base stations 104 on a forward link (FL) and/or a reverse link (RL) at a given moment, depending upon whether the AT is active and whether it is in soft handoff, for example. Wireless communication system 100 may provide service over a large geographic region, for example, macro cells 102a-102g may cover a few blocks in a neighborhood.

Figure 2:
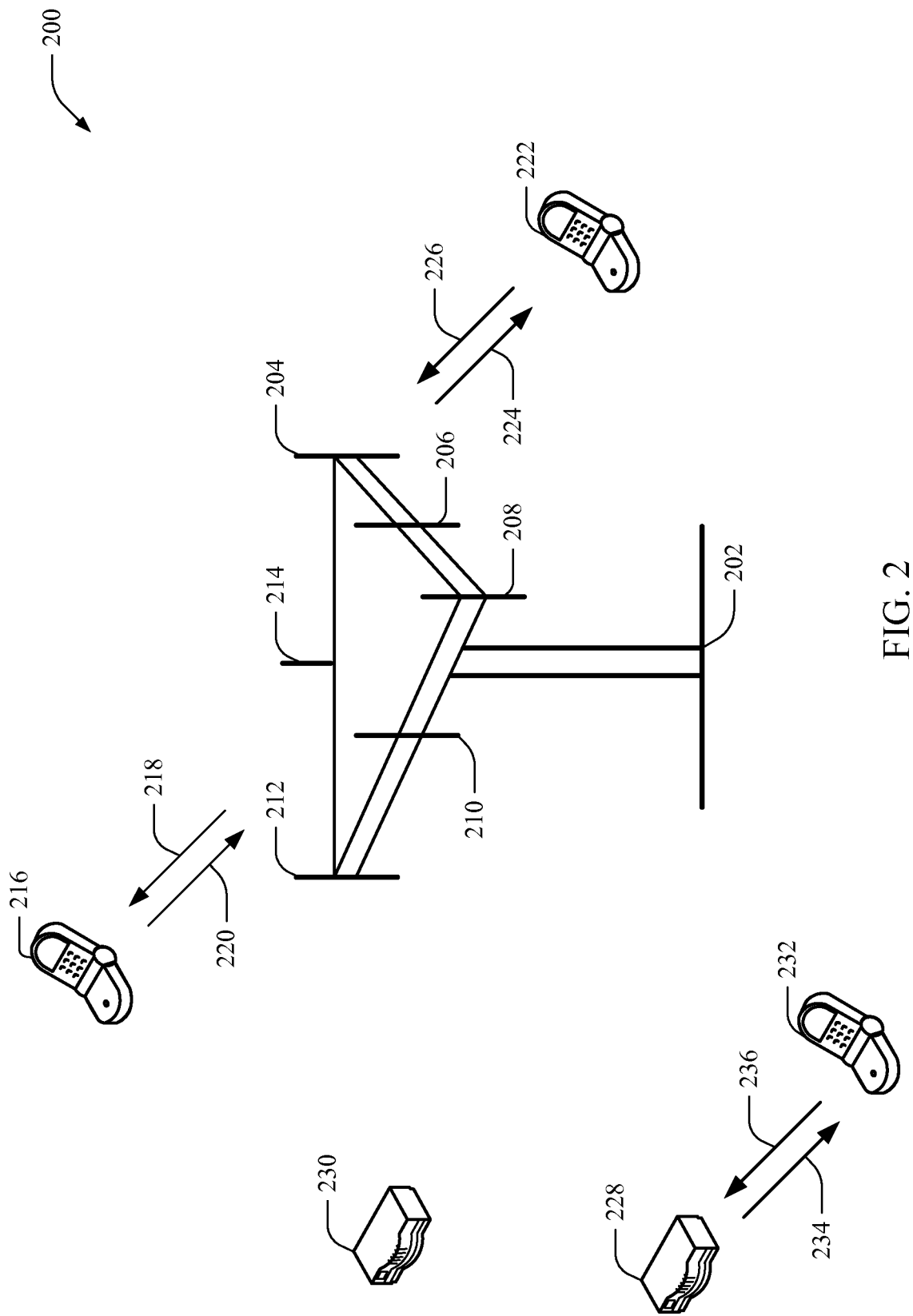
FIG. 2 is an illustration of a wireless communication system in accordance with one or more aspects set forth herein.

Referring now to FIG. 2, a wireless communication system 200 is illustrated in accordance with various embodiments presented herein. System 200 comprises a macro base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of macro base station 202. For example, antenna groups can be designed to communicate to ATs in a sector of the areas covered by base station 202. In communication over forward links 218 and 224, the transmitting antennas of base station 202 can utilize beamforming to improve the signal-to-noise ratio of forward links 218 and 224 for ATs 216 and 222. Also, while base station 202 utilizes beamforming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of macro base station 202 can be implemented in AP base stations 228 and 230, which can be deployed in smaller scale locations, such as a residence or office building for example. As mentioned previously, AP base stations are also referred to as femto cells or Home Node B (HNB) units, and can have a broadband backhaul link to a wireless service provider, such as over DSL, cable, T1/T3, etc., and can provide wireless communication service to one or more ATs. As shown, AP base station 228 can communicate with one or more AT(s) 232 over a forward link 234 and receive communication from the AT(s) 232 over a reverse link 236 similarly to the base station 202.

According to an example, AP base station 230 can be deployed to provide wireless service access. Upon being deployed, AP base station 230 can optionally self-configure to avoid interference with surrounding femto cells (e.g., AP base station 228) and macro cells (e.g., base station 202 or a sector/cell thereof). In this regard, AP base station 230 can receive signals from the base station 202 and disparate AP base station 228 much like ATs 216, 222, and 232. The signals can be overhead system messages that can be utilized by the AP base station 230 to determine configuration parameters utilized by the disparate AP base station 228 and/or base station 202.

The configuration parameters can be determined by AP base station 230 for similar environment configuration. In addition, the parameters can be determined and utilized to ensure AP base station 230 selects different parameters to mitigate interference. These parameters can include, for example, a channel identifier (e.g., a Code Division Multiple Access (CDMA) channel ID), a pseudo-noise (PN) offset, and/or the like, for AP base station 228, macro base station 202, and/or substantially any other surrounding transmitters. AP base station 230 can accordingly self-configure its channel identifier, PN offset, etc. so as not to interfere with the surrounding femto cells and macro cells. Additionally, AP base station 230 can utilize this information to build a neighbor list of surrounding femto cells and macro cells to facilitate hard and soft handoffs for devices communicating with AP base station 230. It is noted that AP base station 230 may be adapted to receive radio frequency (RF) signals, for example, from AP base station 228 and/or base station 202 to determine timing, location, and/or the like.

Figure 3:
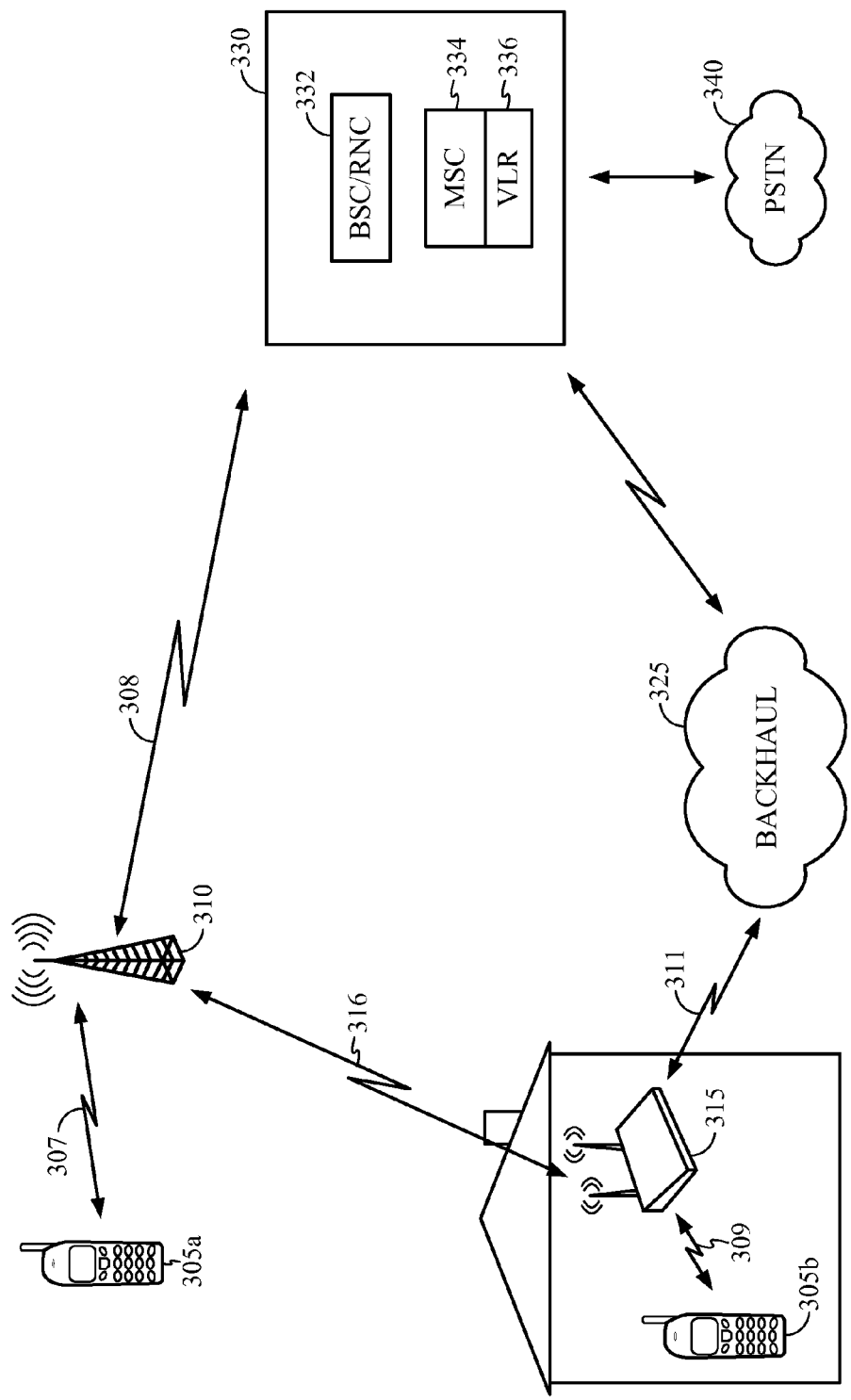
FIG. 3 illustrates an exemplary environment within which an AP base station may be implemented.

In accordance with one or more aspects of the embodiments described herein, FIG. 3 illustrates an exemplary system 300 within which an AP base station 315 may be implemented. System 300 may include an AT 305a in operative communication with a macro base station 310 operatively coupled to a macro network 330, which comprises or is otherwise operatively coupled to a macro network core. System 300 may also include an AT 305b in operative communication with AP base station 315, operatively coupled to a communication backhaul 325, which is in turn operatively coupled to the network core of macro network 330.

In operation, mobile device 305a may send and receive data from macro base station 310 via a communication link 307, which may use various communication standards such as CDMAone, CDMA2000, Wideband CDMA (W-CDMA, also known as Universal Mobile Telecommunications System (UMTS)), Ultra Mobile Broadband (UMB), Long Term Evolution (LTE), LTE-Advanced (LTE-A), Worldwide Interoperability for Microwave Access (WiMAx), etc. Base station 310 may be in communication with macro network 330 via link 308. It is noted that system 300 may be configured to operate on 3rd Generation Partnership Project (3GPP) (Re199, Re15, Re16, Re17) technology, as well as 3GPP2 (1×RTT, 1×EV-DO Re10, RevA, RevB) technology, and other known and related technologies.

Macro network 330 may include a network controller at its network core. Depending on the types of the communication network deployed, the network controller may be a Radio Network Controller (RNC), a modified RNC, an Unlicensed Mobile Access (UMA) network controller, or a Session Initiation Protocol (SIP) gateway, or the like. In the illustrated example, macro base station 310 is in operative communication with RNC 332 of macro network 330. In the embodiment of FIG. 3, macro network 330 includes a Base Station Controller (BSC) or RNC 332. BSC/RNC 332 may be in operative communication with a Message Switching Center (MSC) 334 or similar service delivery node responsible for handling voice calls, Short Message Service (SMS), as well as other services (e.g., conference calls, FAX and circuit switched data). MSC 334 may set up and release the end-to-end connections, handle mobility and hand-over requirements during the call, take care of charging and real time pre-paid account monitoring, etc.

MSC 334 may include or be coupled to a Visitor Location Register (VLR) 336 or similar temporary database of network subscribers who have entered or roamed into a particular area. VLR 336 may be in operative communication with a registry (not shown), which may generally comprise a database that contains details of mobile phone subscribers authorized to use the operator's network. MSC 334 may be in operative communication with a Public Switched Telephone Network (PSTN) 340, Public Line Mobile Network (PLMN), or other similar network. In this way, macro network 330 can deliver voice and data services to end users that are connected to one of those networks. System 300 may be scaled to include additional MSCs and registries (not shown) in operative communication with MSC 334 to increase capacity.

In related aspects, mobile device 305b may communicate with macro network 330 via macro base station 310 and/or AP base station 315 configured to use backhaul service 325 to transfer voice and/or non-voice data there between. Backhaul service 325 may include the internet, a DSL service, a cable internet service, a Local Area Network (LAN), a Wide Area Network (WAN), a Plain Old Telephone System (POTS), or any other suitable broadband network or the like. Mobile 305b may communicate with base station 315 via communication link 309, and may incorporate one or more features of AP base stations described above with reference to FIG. 2. It is noted that base station 315 includes as one of its features the ability to provide a femto cell through which a given AT may communicate with the network core of the macro network 330.

AP base station 315 may be configured to transfer data over backhaul network 325 via communication link 311 (wired or wireless). Depending on the type of system being deployed, communication link 311 may use Voice over IP (VoIP), UMA signaling, SIP signaling, or other suitable communication network protocol, such as, for example, Iub over IP. Iub is a standard transport protocol that may be designed to encapsulate voice and/or non-voice data and to signal as an IP that is tunneled over network 325.

Macro network 330 may process data received from network 325 with a suitable network controller, analogous to the manner in which macro network 330 handles data from macro base station 310. The type of network controller used by macro network 330 depends at least in part on the architecture or types of components of AP base station 315. For example, there are various femto cell architectures such as, for example, IP Radio Access Network (RAN) and SIP/IMS. Within the IP RAN architecture there may be provided various femto cell solutions, such as, for example, modified RNCs, concentrators, etc. implementing various hardware architectures in the network core and/or in the AP base station.

It is also noted that system 300 may comprise WAN macro cells and femto cells deployed within the same general geographical area that reuse the same carrier as the WAN system. In one approach, the WAN system may use a legacy technology, while the femto cell system may use a new technology, such as, for example, an evolved version of the legacy technology that supports AP base station operation efficiently.

Figure 4:
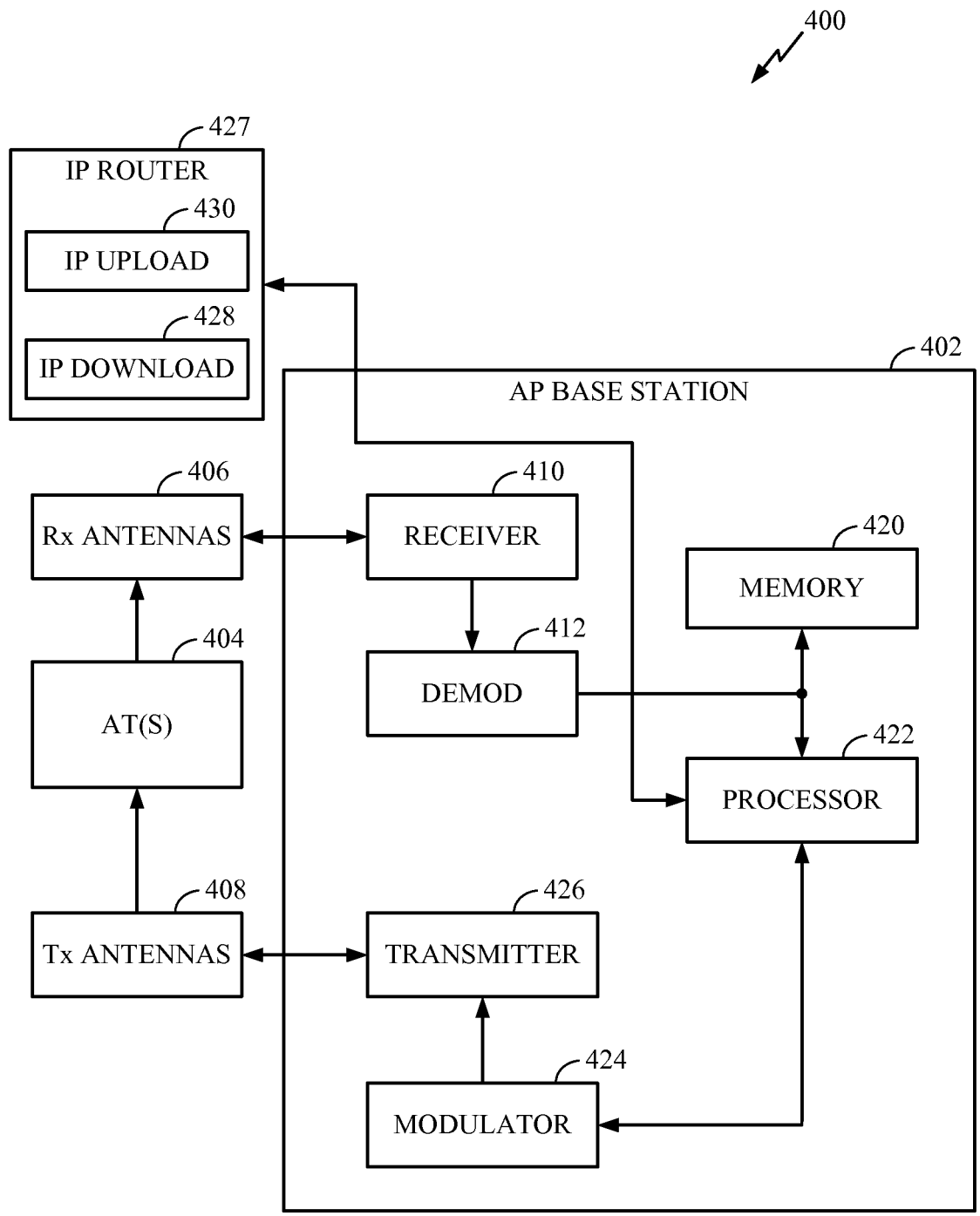
FIG. 4 provides a block diagram of an exemplary AP base station.

In accordance with one or more embodiments and corresponding disclosure thereof, various aspects are described in connection with an AP base station configured to utilize selectively operate in operate in one or more low power modes. With reference to FIG. 4, there is provided an exemplary system 400 comprising an AP base station 402 that may include a receiver component/module 410 adapted to receive signal(s) from AT(s) 404 or from other AP base stations (not depicted) through a plurality of receive antennas 406. AP base station 402 may also include a transmitter component/module 426 adapted to transmit to the AT(s) 404 (or other AP base stations) through one or more transmit antennas 408. Receiver component 410 may receive information from receive antennas 406 and may further comprise a signal recipient (not shown) that receives uplink data transmitted by AT(s) 404. It should be appreciated that receiver component 410 and transmission component 426 may be configured to communicate with ATs or other AP base stations via wireless local area network (WLAN), BPL, Ethernet, UMTS-TDD, or WLAN over UMTS-TDD (e.g., to implement WLAN over a cellular frequency to communicatively couple AP base stations). It is noted a transceiver module (not depicted) may be used in lieu of, or in conjunction with, receiver component 410 and transmission component 426.

Receiver component 410 may be operatively associated with a demodulator 412 adapted to demodulate received information. Demodulated symbols may be analyzed by a processor 422 to generate additional signals (e.g., in the form of transmission and/or routing instructions) modulated by modulator 424 and transmitted by transmitter component 426. Further, processor 422 may be coupled to a memory 420. Memory 420 may store information pertinent to effectuating wired and/or wireless communication, application modules for routing information between neighboring AP base stations, macro base stations, and/or ATs, and/or any other suitable information related to performing the various actions and functions set forth herein.

Processor 422 may route at least a portion of traffic associated with a communication link between AP base station 402 and AT 404 to a neighboring AP base station (not depicted) for transfer to a cellular network (e.g., by way of a direct connection to the cellular network, or by way of the Internet). Furthermore, processor 422 may be adapted to direct traffic affiliated with AP base station 402 (e.g., generated by a predetermined AT or group of ATs, for instance) directly to the cellular network by way of an IP upload link 430 (e.g., DSL connection, such as ADSL, VDSL, HDSL, or cable IP connection, or BPL connection). In addition, data may be received from the cellular network via an IP download link 428 (e.g., DSL, cable, BPL) and directed to an AT 404 affiliated with the AP base station 402. It is noted that AP base station 402 may comprise one or more processors 422.

Receiver component 410 and transmitter component 426 may receive and transmit, respectively, various information to/from a cellular network (e.g., via IP upload 430 and/or IP download 428) or to/from other AP base stations by way of an IP router 427 that communicates over unlicensed frequencies or wired connections (e.g., WLAN router, LAN router, or the like). It is noted that the receiver and transmitter components/modules 410, 426 may be part of or replaced with a transceiver module (not depicted) in other embodiments. The depicted receiver 410 and transmitter 426, or alternatively a transceiver, may be adapted to support communication links with a plurality of APs.

AP base station 402 may include a positioning receiver (not depicted) for acquiring signals from a first data source, such as, a plurality of satellites of a Global Positioning Satellite (GPS) system or other Satellite Positioning System (SPS) (e.g., the Global Navigation Satellite System (GLONASS/GNSS), the proposed European Galileo System, etc.). AP base station 402 may include a transceiver module (not depicted) for communicating with at least one of (a) an AT, (b) the macro network via the backhaul, and (c) a macro base station and/or neighboring AP base station in operative communication with the macro network.

In related aspects, memory 420 may contain application modules or applications that generate or comprise code/instructions for processor 422 to: (a) determine whether any ATs are present within at least one defined coverage area; (b) in response to no ATs being within the at least one coverage area, place AP base station 402 in a first low power mode; (c) in response to at least one AT being within the at least one coverage area, determine whether each of the at least one AT is an idle state; (d) in response to each of the at least one AT being in the idle state, place AP base station 402 in a second low power mode; and (e) when AP base station is in the first/second low power mode, instruct transmitter component 426 or a transceiver module to vary a transmission power at which at least one common channel is transmitted as a function of time. It is noted that processor 422 may, in response to a given one of the at least one AT being in an awake state, place the AP base station 402 in a normal mode.

In further related aspects, processor 422 may determine whether the at least one AT is present within the at least one coverage area by determining whether the at least one AT is present within a femto coverage area of an AP base station. Transmitter component 426 may vary the transmission power of at least one of a synchronization channel, a pilot/reference signal, and a broadcast channel.

In yet further related aspects, processor 422 may determine whether the at least one AT is present within the at least one coverage area by receiving information regarding whether the at least one AT is present within a macro coverage area of a macro base station of the macro network. Receiver component 410 or a transceiver module may receive a wake-up signal transmitted from the macro network. The wake-up signal may be based at least in part on identification of at least one of a serving cell and a neighboring cell reported by the at least one AT. In the alternative, or in addition, the wake-up signal may be based at least in part on mobility data regarding the at least one AT as determined by the macro network.

In still further related aspects, AP base station 402 may cease to operate in the low power mode in response to receiving the wake-up signal. Processor 422 may instruct transmitter component 426 to modify the transmission power in response to receiving the wake-up signal, such as, for example, by increasing the transmission power.

Figure 5:
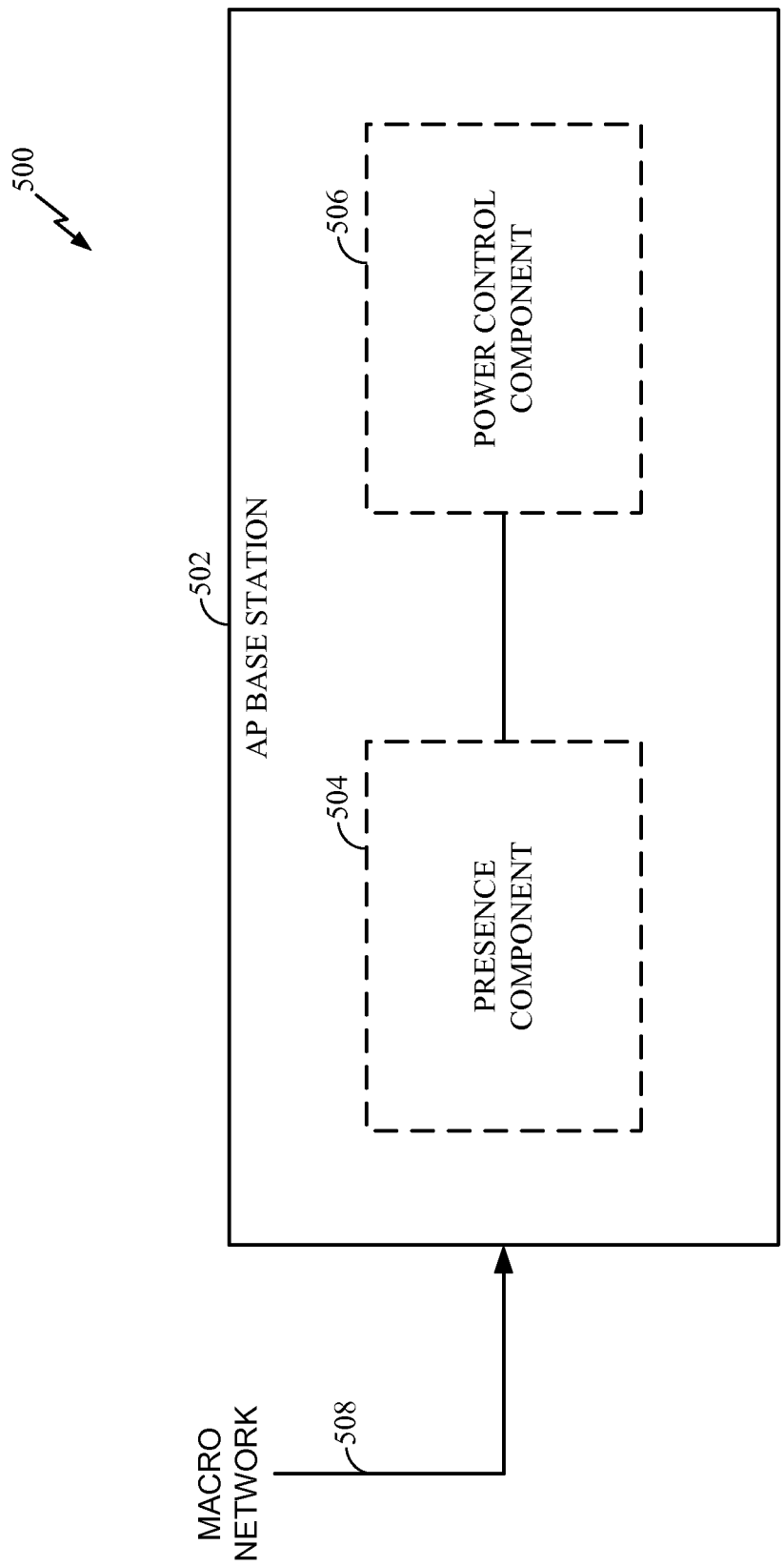
FIG. 5 is a general component block diagram illustrating a system that deploys a low power mode in an AP base station.

FIG. 5 provides a general component block diagram illustrating a system to enable lower power modes in AP base stations. As shown in FIG. 5, a system 500 may include an AP base station 502 having a presence component 504 and a power control component 506.

In one embodiment, presence component 504 may determine the presence of at least one AT associated (e.g. registered) with AP base station 502. Additionally, presence component 504 may determine the state of the associated AT(s). For instance, the presence component 504 can determine if the synchronized ATS are awake or idle.

Presence component 504 may communicate information regarding the presence and the state of the associated ATs (e.g. presence data) to power control component 506. The power control component 506 may control the power level at which AP base station 502 transmits a plurality of signals based at least in part on the presence data. For instance, when no ATs are registered with AP base station 502, or all registered ATs are idle, power control component 506 may direct AP base station 502 to transmit in a low power mode. In low power mode, AP base station 502 may vary (e.g., as a function of time) the power level at which it transmits one or more common channels.

Power control component 506 may ensure that the power level is maintained at a nominal level with adequate frequency to allow new ATs to detect the AP base station 502, and/or ensure alignment between the awake periods of associated ATs and periods when the transmission power of AP base station 502 is at the nominal level. The common channels may be channels that AP base station 502 is required to transmit in order to allow ATs to detect and/or connect to AP base station 502. The common channels may include but are not limited to synchronization channels, pilot or reference signals, and broadcast channels.

It is noted that, in another embodiment, presence component 504 may be configured to detect or determine the presence of any ATs within a femto coverage area of AP base station 502, regardless of whether the ATs are associated with the AP base station 502.

Additionally or alternatively, a macro network 508 may communicate with AP base station 502 to send wake-up signals to AP base station cell 502 based on identification of a serving cell and/or identification of neighbor cells reported by ATs, associated or otherwise, to macro network 508. Furthermore, macro network 508 may also send to AP base station 502 data or estimates regarding a given AT's mobility. In turn, AP base station 502 may modify or eliminate usage of low power modes based on the mobility data or estimates thereof.

Figure 6:
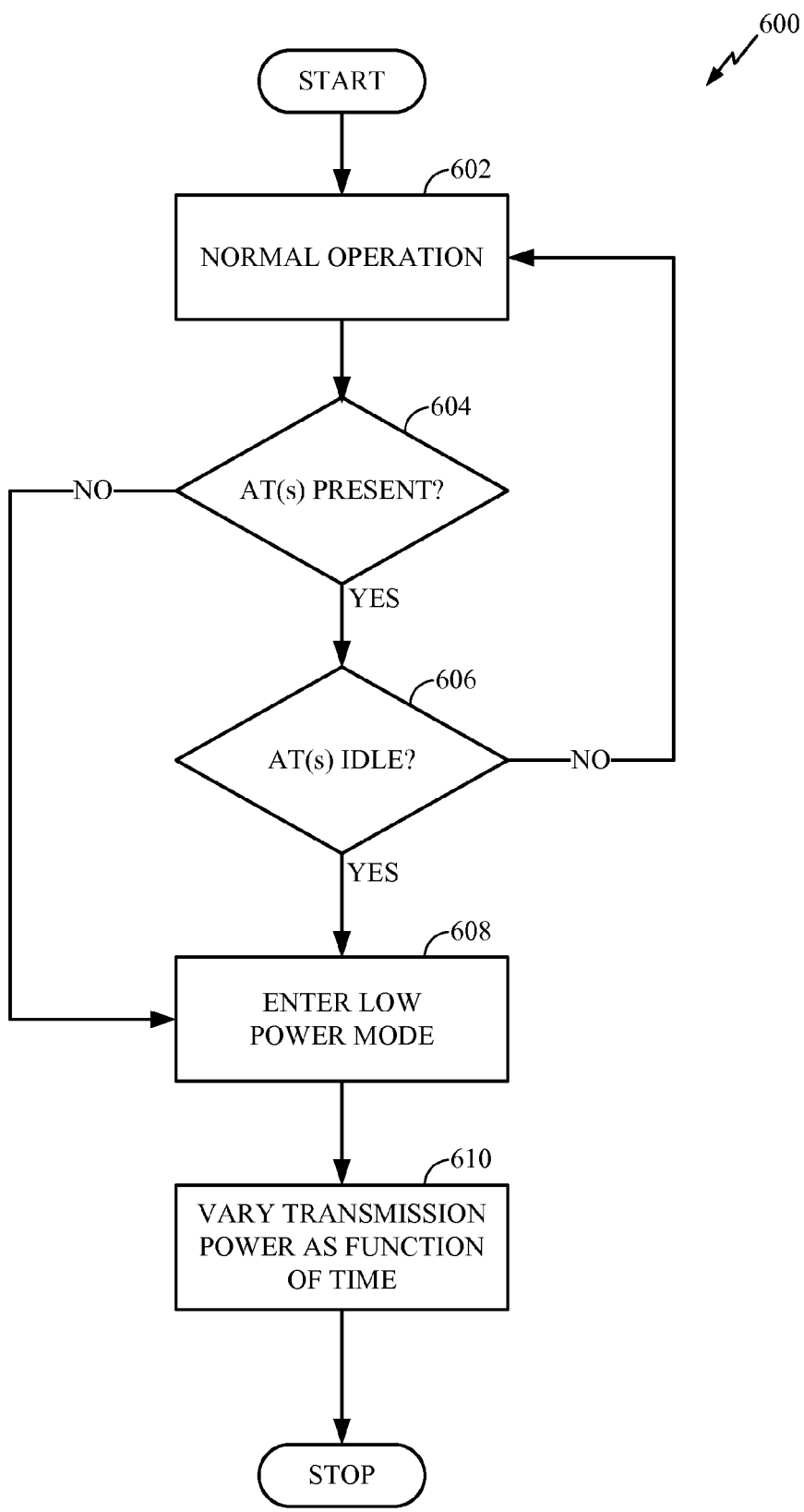
FIG. 6 is a flow chart illustrating a generalized method that facilitates deployment of a low power mode in an AP base station.
Figure 7:
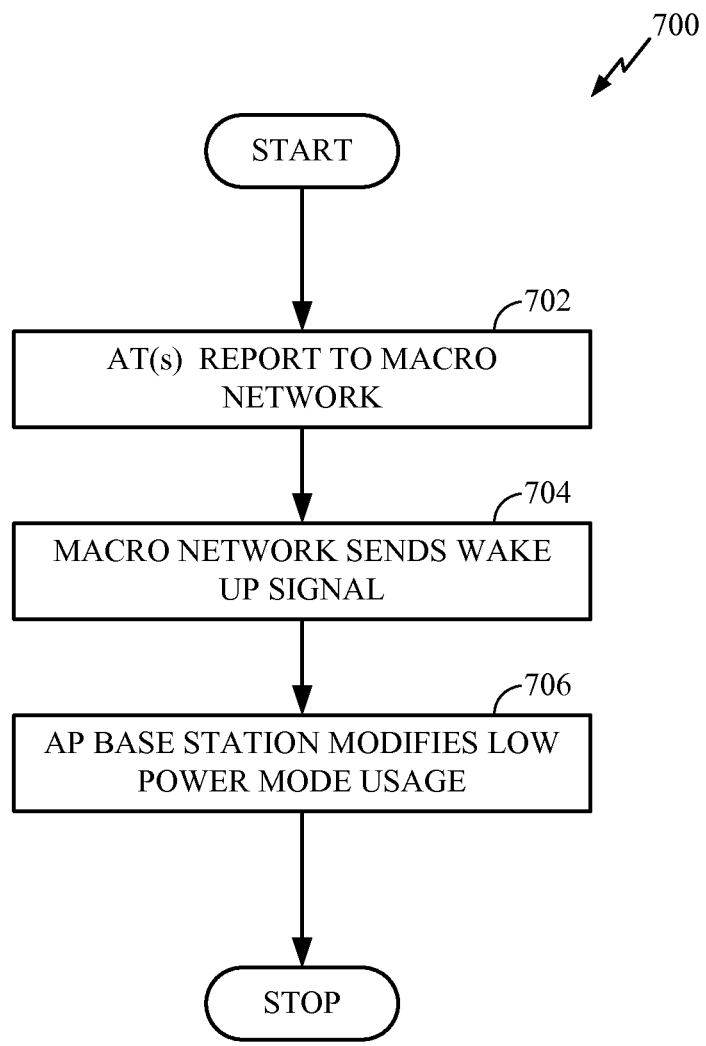
FIG. 7 is a flow chart illustrating aspects of a generalized method for facilitating deployment of a low power mode in an AP base station.

In view of the exemplary systems described above, an exemplary method that may be implemented in accordance with the disclosed subject matter will be better appreciated with reference to the flow charts of FIGS. 6 and 7. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methods described below.

FIG. 6 illustrates a method 600 that facilitates implementing a low power mode in an AP base station. At step 602, the AP base station is operating normally or in a non-low power mode. At step 604, the AP base station determines the presence of one or more ATs (e.g., ATs associated with the AP base station). At step 606, if there is at least one AT present, then the AP base station determines the wake state/status (e.g. awake or idle) of the ATs. At step 608, if all ATs are idle (YES at step 606), or there are no ATs (NO at step 604), then the AP base station enters a low power mode. At step 610, in low power mode, the AP base station may vary the power level at which it transmits common channels (e.g., synchronization, pilot or reference signals, broadcast channels, etc.) as a function of time. The AP base station may ensure the power level is maintained at a nominal level often enough to allow any new ATs to detect its presence, and/or connect to the AP base station. The AP base station preferably adjusts or modifies the transmission power and/or the transmission timing of a transmitter component (or a transceiver module) to correlate or match (a) the awake periods of the ATs and (b) the periods of nominal power transmission. The nominal power level can be predetermined or varied/adjusted (e.g., determined in real time) by the AP base station.

FIG. 7 illustrates aspects of a method 700 that facilitates implementing a low power mode in an AP base station. At step 702, one or more ATs report serving cell and/or neighbor cell identifications to the macro network. At step 704, the macro network may transmit a wake-up signal or the like to the AP base station (typically an AP base station associated with the ATs) based at least in part on the ATs reports. Additionally or alternatively, the macro network may estimate the mobility of the ATs, and transmit wake-up signals to the AP base station based at least in part on the mobility estimates. At step 706, the AP base station may receive the wake-up signals from the macro network, and may modify or eliminate its usage of low power modes based at least in part on the received wake-up signals.

Figure 8A:
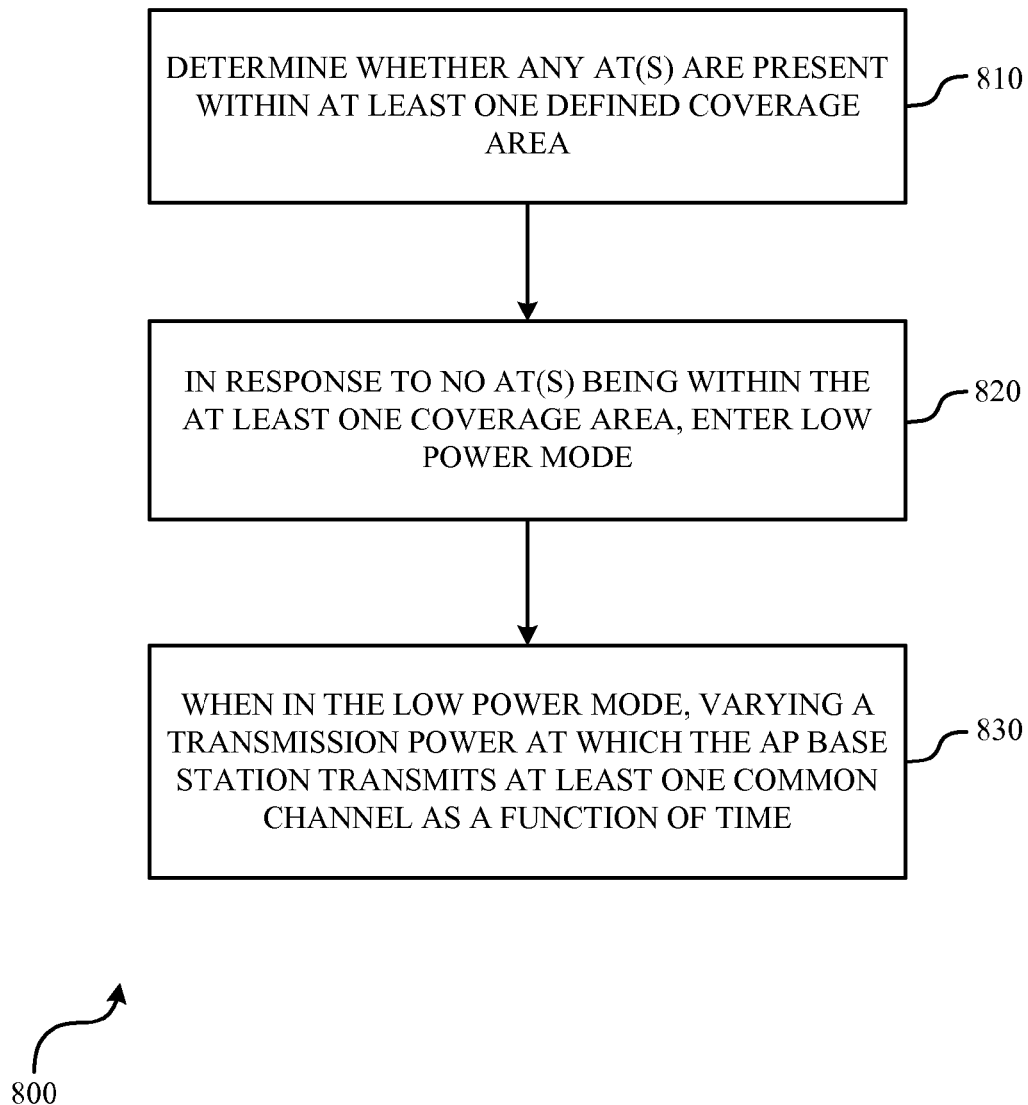
FIG. 8A shows one embodiment for a method for facilitating deployment of a low power mode in an AP base station.

In accordance with one or more aspects of the embodiments described herein, FIG. 8A illustrates an exemplary method 800 for facilitating deployment of a low power mode in an AP base station that may involve steps 810-874 described below. At step 810, method 800 may involve determining whether any access terminals (ATs) are present within at least one defined coverage area. In response to no ATs being within the at least one coverage area, the low power mode may be entered (step 820). Method 800 may involve, when in the low power mode, varying a transmission power at which the AP base station transmits at least one common channel as a function of time (step 830).

Figure 8B:
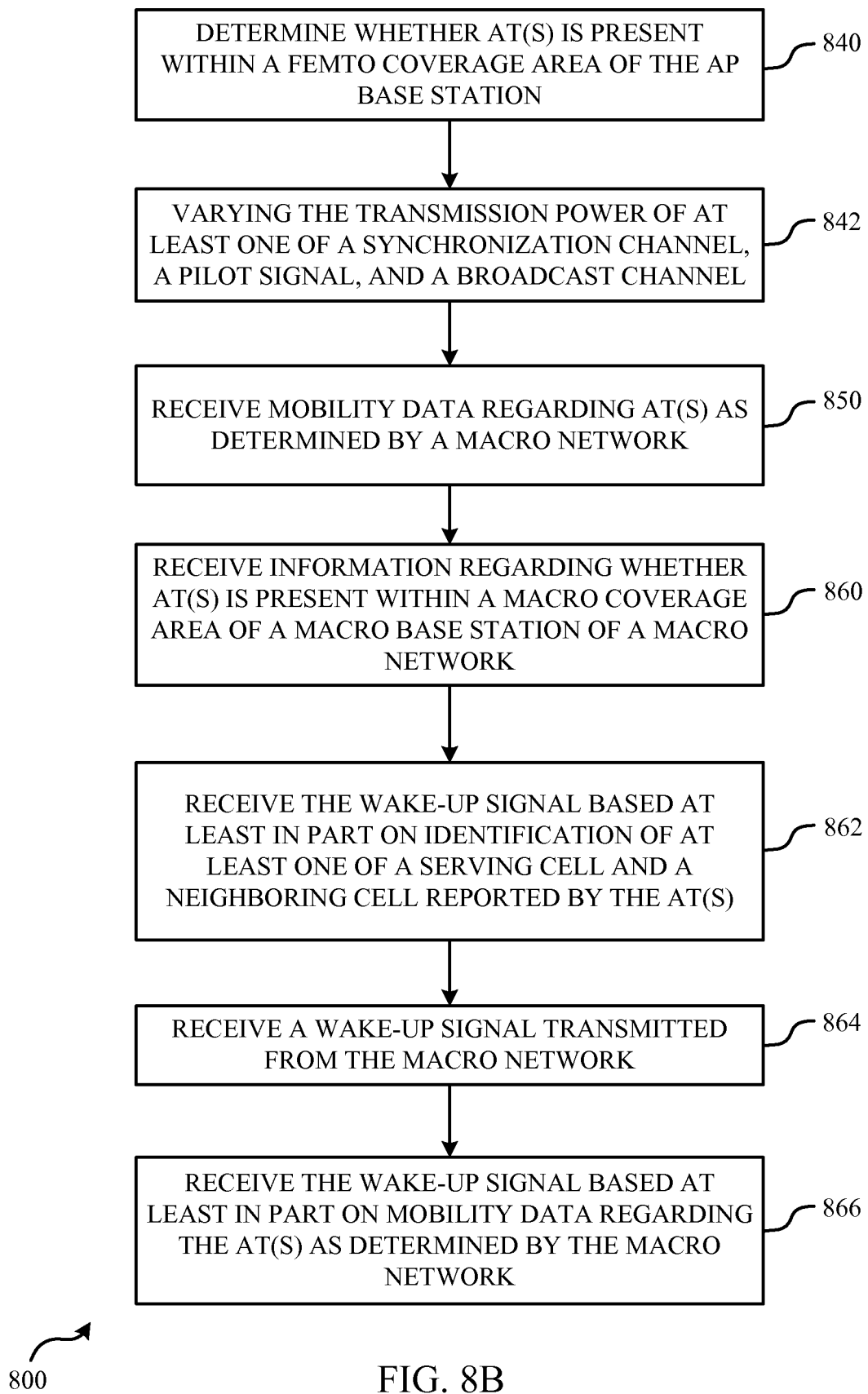
FIGS. 8B-C show sample aspects of the method shown in FIG. 8A.

With reference to FIG. 8B, step 810 may involve determining whether at least one AT is present within a femto coverage area of the AP base station (step 840). Step 830 may involve varying the transmission power of at least one of a synchronization channel, a pilot signal, and a broadcast channel (step 842). In another approach, step 810 may involve receiving mobility data regarding at least one AT as determined by a macro network (step 850).

In related aspects, step 810 may involve receiving information regarding whether at least one AT is present within a macro coverage area of a macro base station of a macro network (step 860). At step 862, method 800 may involve receiving a wake-up signal transmitted from the macro network. Step 862 may involve receiving the wake-up signal based at least in part on identification of at least one of a serving cell and a neighboring cell reported by the at least one AT (step 864). In the alternative, or in addition, step 862 may involve receiving the wake-up signal based at least in part on mobility data regarding the at least one AT as determined by the macro network (step 866).

Figure 8C:
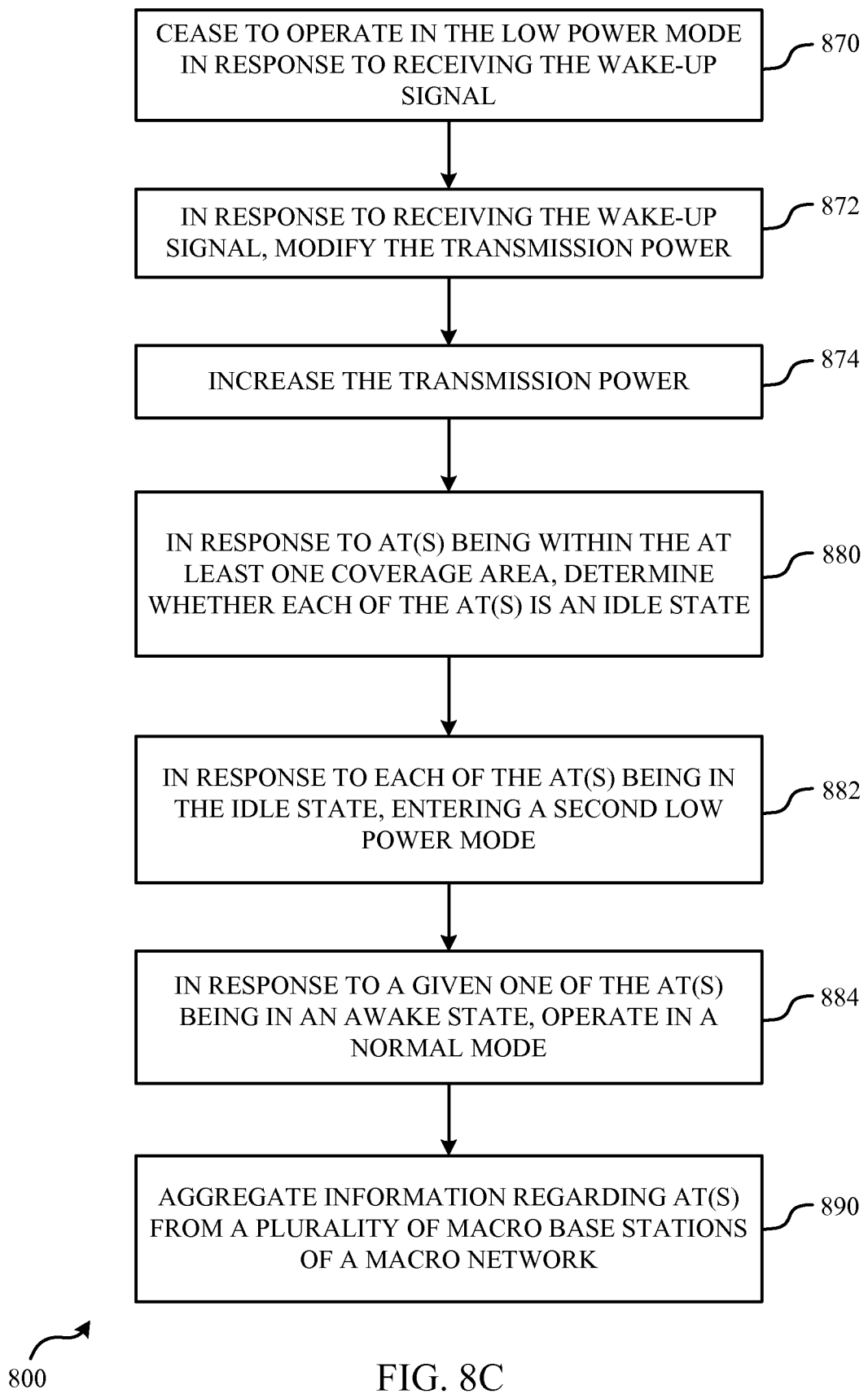

With reference to FIG. 8C, at step 870, method 800 may further involve ceasing to operate in the low power mode in response to receiving the wake-up signal. In response to receiving the wake-up signal, the transmission power may be modified (step 872). Step 882 may involve increasing the transmission power (step 874).

In further related aspects, method 800 may further involve, in response to at least one AT being within the at least one coverage area, determining whether each of the at least one AT is an idle state (step 880). Method 800 may involve, in response to each of the at least one AT being in the idle state, entering a second low power mode (step 882). At step 884, in response to a given one of the at least one AT being in an awake state, the method 800 may involve operating in a normal mode. In yet further related aspects, step 810 may involve aggregating information regarding at least one AT from a plurality of macro base stations of a macro network (sub-step 890).

Figure 9A:
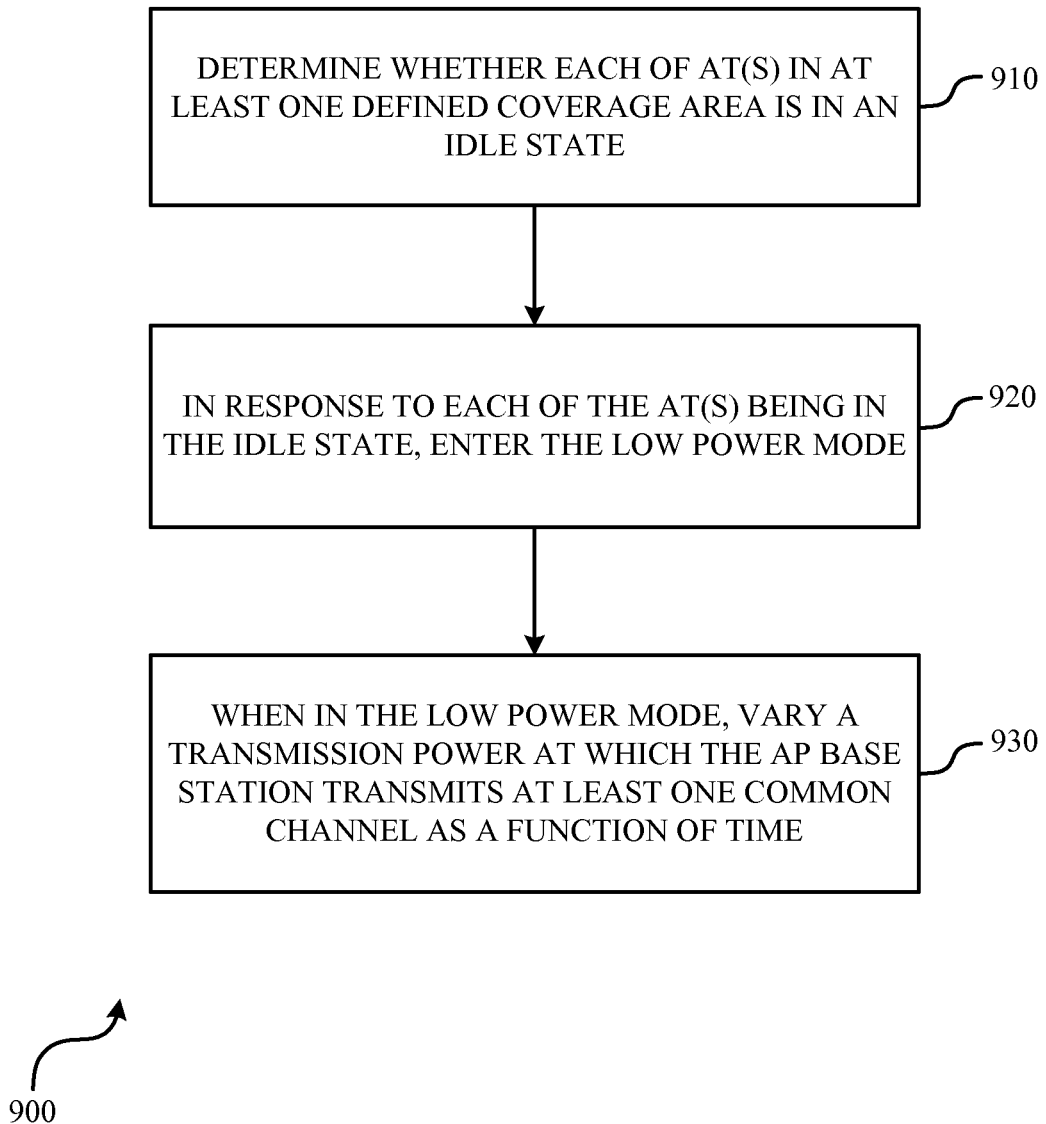
FIG. 9A shows another embodiment for a method for facilitating deployment of a low power mode in an AP base station.

In accordance with one or more aspects of the embodiments described herein, FIG. 9A illustrates another embodiment of a method for facilitating deployment of a low power mode in an AP base station. With reference to FIG. 9A, there is provided an exemplary method 900 for facilitating deployment of a low power mode in an AP base station that may involve steps 910-950 described below. At step 910, method 900 may involve determining whether each of at least one access terminal (AT) in at least one defined coverage area is in an idle state. In response to each of the at least one AT being in the idle state, the low power mode may be entered (step 920). When in the low power mode, method 900 may involve varying a transmission power at which the AP base station transmits at least one common channel as a function of time (step 930).

Figure 9B:
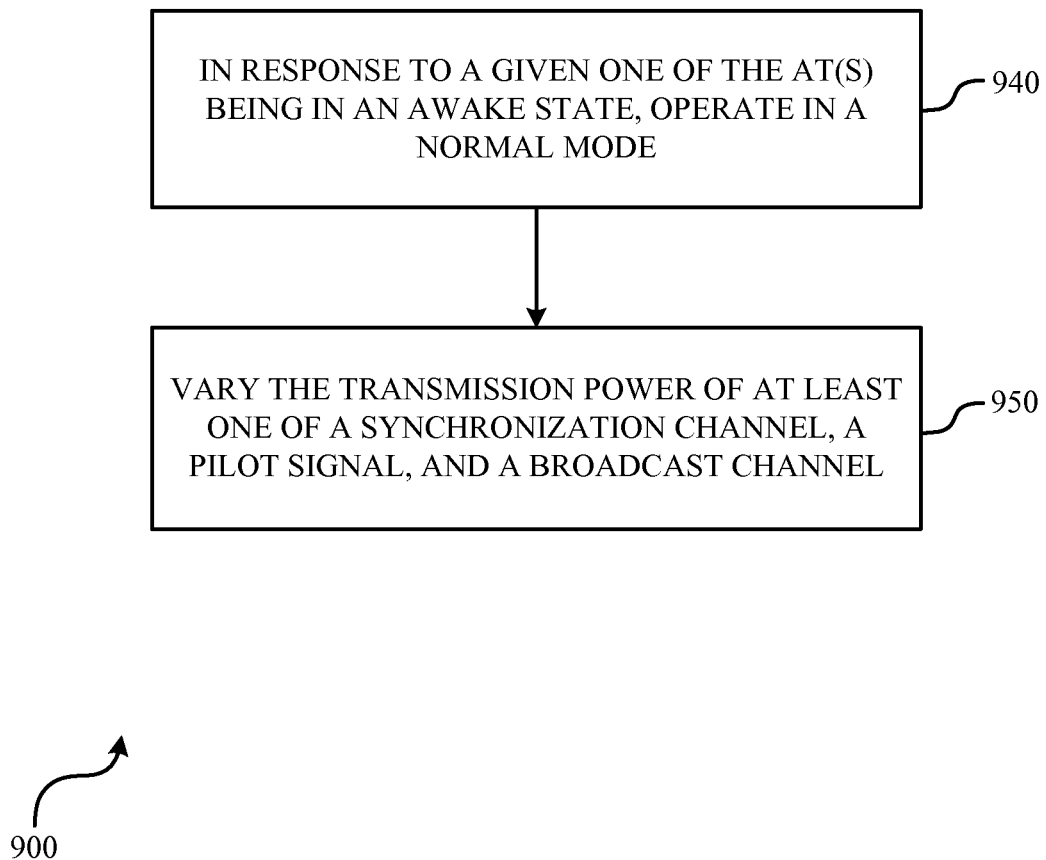
FIGS. 9B shows sample aspects of the method shown in FIG. 9A.

With reference to FIG. 9B, method 900 may further involve, in response to a given one of the at least one AT being in an awake state, operating in a normal mode (step 940). Step 930 may involve varying the transmission power of at least one of a synchronization channel, a pilot signal, and a broadcast channel (step 950).

Figure 10A:
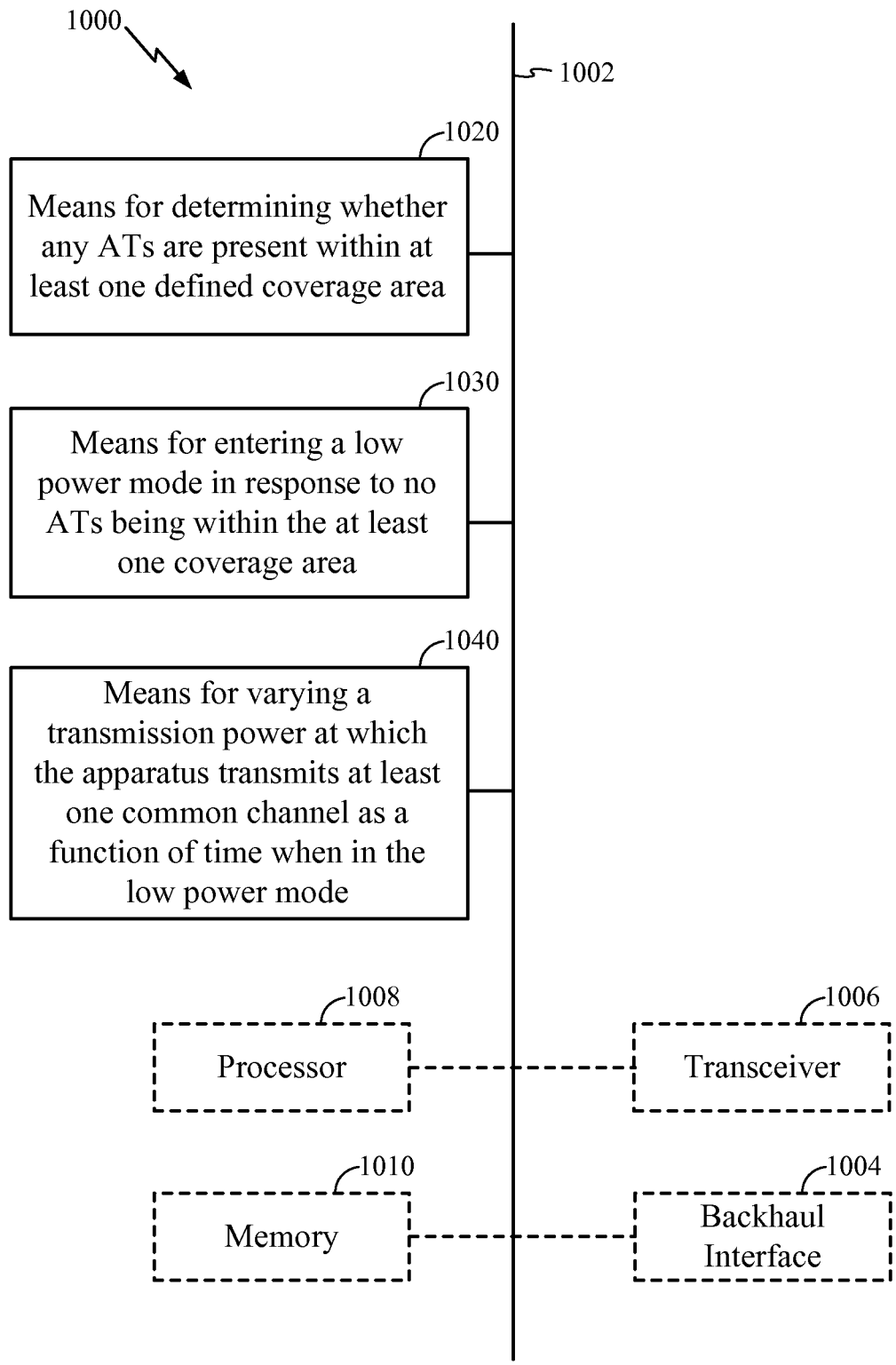
FIG. 10A illustrates one embodiment of an apparatus configured for deployment of a low power mode.

In accordance with one or more aspects of the embodiments described herein, FIG. 10A illustrates an exemplary device/apparatus 1000 that may be configured as either an AP base station, or as a processor or similar device for use within an AP base station.

As illustrated, apparatus 1000 may include a means 1020 for determining whether any ATs are present within at least one defined coverage area. Apparatus 1000 may include a means 1030 for entering a low power mode in response to no ATs being within the at least one coverage area. Apparatus 1000 may also include a means 1040 for varying a transmission power at which the apparatus transmits at least one common channel as a function of time when in the low power mode. The at least one common channel may comprise at least one of a synchronization channel, a pilot signal, and a broadcast channel.

Figure 10B:
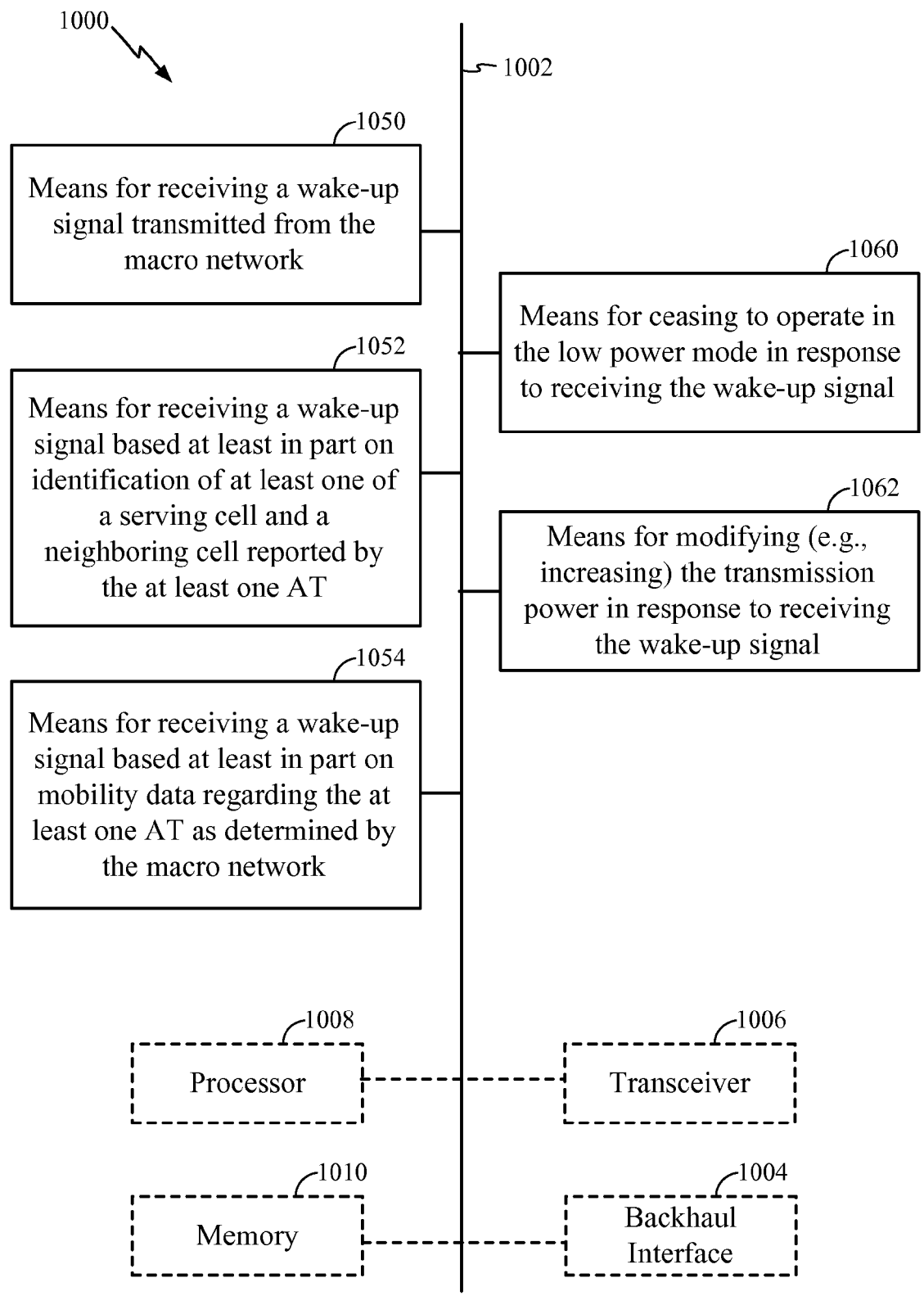
FIGS. 10B-C illustrate sample aspects of the apparatus shown in FIG. 10A.

In one embodiment, the at least one coverage area may comprise a femto coverage area of an AP base station. In another embodiment, the at least one coverage area may comprise a macro coverage area of a macro base station of the macro network. With reference to FIG. 10B, apparatus 1000 may comprise a means 1050 for receiving a wake-up signal transmitted from the macro network. Apparatus 1000 may comprise a means 1052 for receiving a wake-up signal based at least in part on identification of at least one of a serving cell and a neighboring cell reported by the at least one AT. Apparatus 1000 may comprise a means 1054 for receiving a wake-up signal based at least in part on mobility data regarding the at least one AT as determined by the macro network.

In related aspects, apparatus 1000 may comprise a means 1060 for ceasing to operate in the low power mode in response to receiving the wake-up signal. Apparatus 1000 may comprise a means 1062 for modifying (e.g., increasing) the transmission power in response to receiving the wake-up signal.

Figure 10C:
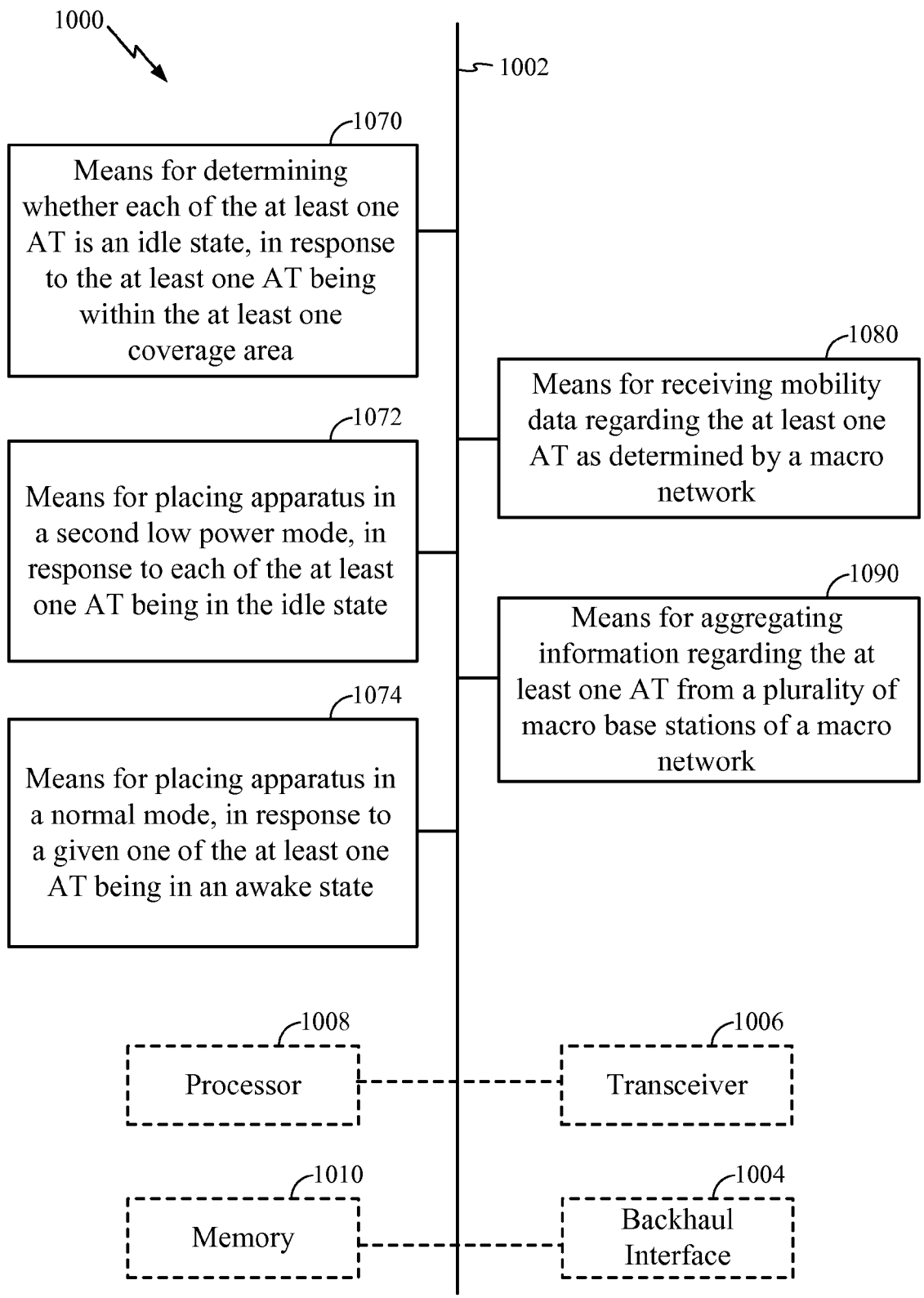

With reference to FIG. 10C, apparatus 1000 may comprise: a means 1070 for, in response to the at least one AT being within the at least one coverage area, determining whether each of the at least one AT is an idle state; and a means 1072 for, in response to each of the at least one AT being in the idle state, placing apparatus 1000 in a second low power mode. Apparatus 1000 may comprise a means 1074 for, in response to a given one of the at least one AT being in an awake state, placing apparatus 1000 in a normal mode.

In related aspects, apparatus 1000 may comprise a means 1080 for receiving mobility data regarding the at least one AT as determined by a macro network. Apparatus 1000 may comprise a means 1090 for aggregating information regarding the at least one AT from a plurality of macro base stations of a macro network.

It is noted that apparatus 1000 may optionally include a processor module 1008 having at least one processor, in the case of apparatus 1000 configured as an AP base station, rather than as a processor. Processor 1008, in such case, may be in operative communication with means 1020-1090, and components thereof, via a bus 1002 or similar communication coupling. Processor 1008 may effect initiation and scheduling of the processes or functions performed by means 1020-1090, and components thereof In related aspects, apparatus 1000 may include a backhaul interface 1004 for the backhaul in operative communication with a macro network. Apparatus 1000 may include a transceiver module 1006 for communicating with at least one of (a) an AT, (b) the macro network via the backhaul, and (c) a base station (e.g., macro base station or neighboring AP base station) in operative communication with the macro network. A stand alone receiver and/or stand alone transmitter may be used in lieu of or in conjunction with transceiver 1006.

In further related aspects, apparatus 1000 may optionally include a means for storing information, such as, for example, a memory device/module 1010. Computer readable medium or memory device/module 1010 may be operatively coupled to the other components of apparatus 1000 via bus 1002 or the like. The computer readable medium or memory device 1010 may be adapted to store computer readable instructions and data for effecting the processes and behavior of means 1020-1090, and components thereof, or processor 1008 (in the case of apparatus 1000 configured as an AP base station) or the methods disclosed herein.

In yet further related aspects, the memory module 1010 may optionally include executable code for the processor module 1008 to: (a) determine whether any ATs are present within at least one defined coverage area; (b) in response to no ATs being within the at least one coverage area, place apparatus 1000 in a low power mode; and (c) when apparatus 1000 is in the low power mode, instruct the transceiver module 1006 to vary a transmission power at which the transceiver module transmits at least one common channel as a function of time. One or more of steps (a)-(c) may be performed by processor module 1008 in lieu of or in conjunction with the means 1020-1090 described above.

Figure 11:
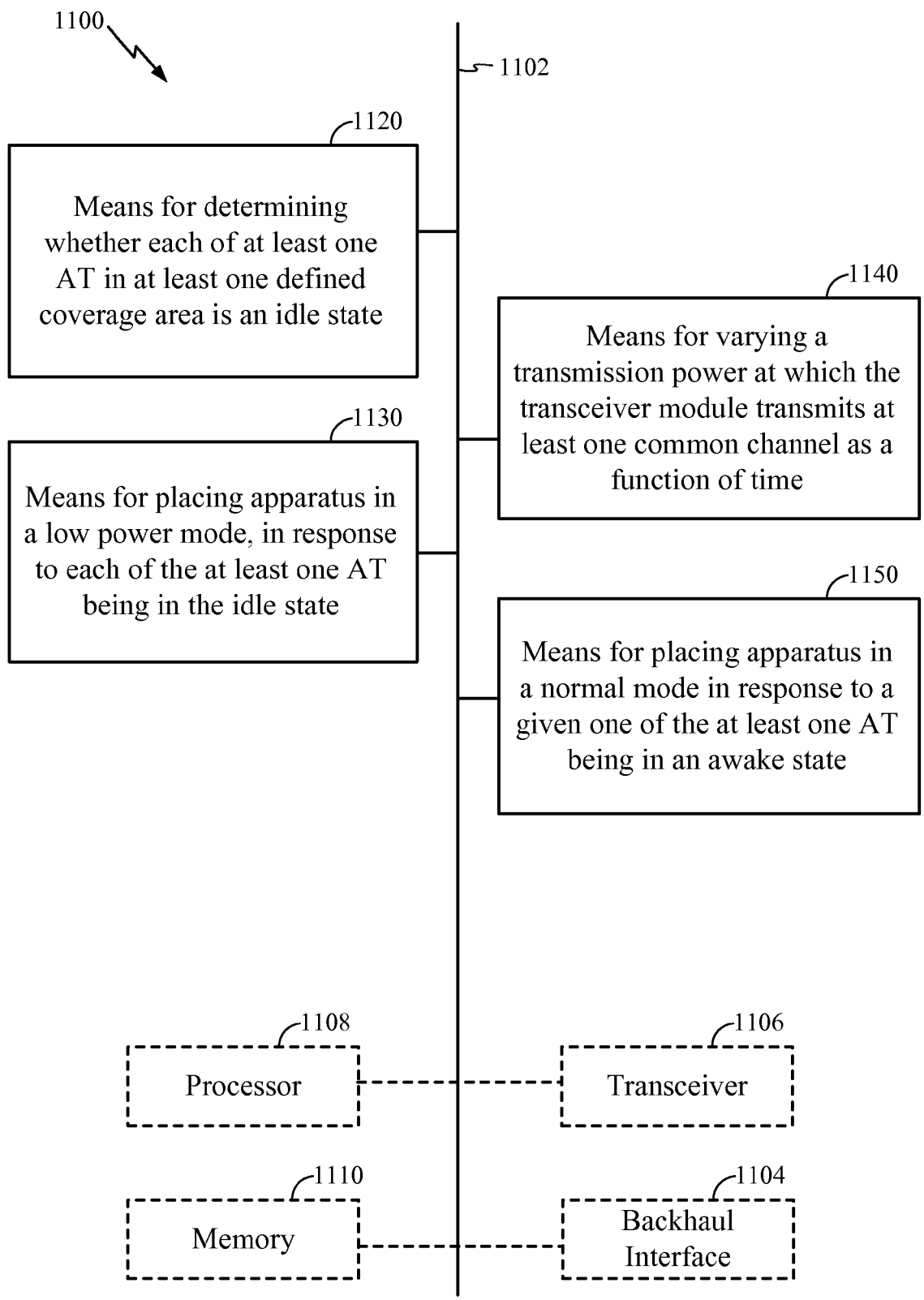
FIG. 11 illustrates another embodiment of an apparatus configured for deployment of a low power mode.

In accordance with one or more aspects of the embodiments described herein, FIG. 11 illustrates another embodiment of a device/apparatus for facilitating deployment of a low power mode by an AP base station. With reference to FIG. 11A, apparatus 1100 that may be configured as either an AP base station, or as a processor or similar device for use within an AP base station.

As illustrated, apparatus 1100 may include a means 1120 for determining whether each of at least one AT in at least one defined coverage area is an idle state. Apparatus 1100 may include a means 1130 for placing apparatus 1100 in a low power mode, in response to each of the at least one AT being in the idle state. Apparatus 1100 may also include a means 1140 for varying a transmission power at which the transceiver module transmits at least one common channel as a function of time. Apparatus 1100 may further include a means 1150 for placing apparatus 1100 in a normal mode in response to a given one of the at least one AT being in an awake state. It is noted that the at least one common channel may comprise at least one of a synchronization channel, a pilot signal, and a broadcast channel.

It is noted that apparatus 1100 may optionally include a processor module 1108 having at least one processor, in the case of apparatus 1100 configured as an AP base station, rather than as a processor. Processor 1108, in such case, may be in operative communication with means 1120-1150, and components thereof, via a bus 1102 or similar communication coupling. Processor 1108 may effect initiation and scheduling of the processes or functions performed by means 1120-1150, and components thereof In related aspects, apparatus 1100 may include a backhaul interface 1104 for the backhaul in operative communication with a macro network. Apparatus 1100 may include a transceiver module 1106 for communicating with at least one of (a) an AT, (b) the macro network via the backhaul, and (c) a base station (e.g., macro base station or neighboring AP base station) in operative communication with the macro network. A stand alone receiver and/or stand alone transmitter may be used in lieu of or in conjunction with transceiver 1106.

In further related aspects, apparatus 1100 may optionally include a means for storing information, such as, for example, a memory device/module 1110. Computer readable medium or memory device/module 1110 may be operatively coupled to the other components of apparatus 1100 via bus 1102 or the like. The computer readable medium or memory device 1110 may be adapted to store computer readable instructions and data for effecting the processes and behavior of means 1120-1150, and components thereof, or processor 1108 (in the case of apparatus 1100 configured as an AP base station) or the methods disclosed herein.

In yet further related aspects, the memory module 1110 may optionally include executable code for the processor module 1108 to: (a) determine whether each of at least one AT in at least one defined coverage area is an idle state; (b) in response to each of the at least one AT being in the idle state, place apparatus 1100 in a low power mode; and (c) when apparatus 1100 is in the low power mode, instruct the transceiver module 1106 to vary a transmission power at which the transceiver module transmits at least one common channel as a function of time. One or more of steps (a)-(c) may be performed by processor module 1108 in lieu of or in conjunction with the means 1120-1150 described above.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femto cells and/or macro cells as described. As used herein, the term to "infer," or "inference," refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Terms and phrases used in this document, and variations thereof, unless otherwise expressly stated, should be construed as open ended as opposed to limiting.

As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a mobile device. A mobile device can also be called a system, subscriber unit, subscriber station, mobile station, mobile, remote station, remote terminal, Access Terminal (AT), user terminal, terminal, wireless communication device, user agent, user device, or User Equipment (UE). A mobile device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may include W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, CDMA2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for facilitating deployment of a low power mode in an access point (AP) base station, comprising:
    determining whether any access terminals (ATs) are present within at least one defined coverage area;
    in response to no ATs being within the at least one coverage area, entering the low power mode; and
    when in the low power mode, varying a transmission power at which the AP base station transmits on a synchronization channel, a pilot signal and a broadcast channel as a function of time, wherein a transmission power level is maintained at a nominal level with adequate frequency to allow new ATs to detect the AP base station and ensure alignment between awake periods of any of the new ATs that become associated with the AP base station.

2. The method of claim 1, wherein determining whether any ATs are present within the at least one coverage area comprises determining whether at least one AT is present within a femto coverage area of the AP base station.

3. The method of claim 1, wherein determining whether any ATs are present within the at least one coverage area comprises receiving mobility data regarding at least one AT as determined by a macro network.

4. The method of claim 1, wherein determining whether any ATs are present within the at least one coverage area comprises receiving information regarding whether at least one AT is present within a macro coverage area of a macro base station of a macro network.

5. The method of claim 1, wherein determining whether any ATs are present within the at least one coverage area comprises receiving a wake-up signal transmitted from a macro network.

6. The method of claim 5, further comprising receiving the wake-up signal based at least in part on identification of at least one of a serving cell and a neighboring cell reported by the at least one AT.

7. The method of claim 5, further comprising receiving the wake-up signal based at least in part on mobility data regarding the at least one AT as determined by the macro network.

8. The method of claim 5, further comprising ceasing to operate in the low power mode in response to receiving the wake-up signal.

9. The method of claim 5, further comprising modifying the transmission power in response to receiving the wake-up signal.

10. The method of claim 9, wherein modifying comprises increasing the transmission power.

11. The method of claim 1, further comprising:
    in response to at least one AT being within the at least one coverage area, determining whether each of the at least one AT is an idle state; and
    in response to each of the at least one AT being in the idle state, entering a second low power mode.

12. The method of claim 11, further comprising, in response to a given one of the at least one AT being in an awake state, operating in a normal mode.

13. The method of claim 1, wherein determining whether any ATs are present within the at least one coverage area comprises aggregating information regarding at least one AT from a plurality of macro base stations of a macro network.

14. A method for facilitating deployment of a low power mode in an access point (AP) base station, comprising:
    determining whether each of at least one access terminal (AT) in at least one defined coverage area is in an idle state;
    in response to each of the at least one AT being in the idle state, entering the low power mode; and
    when in the low power mode, varying a transmission power at which the AP base station transmits on a synchronization channel, a pilot signal and a broadcast channel as a function of time, wherein a transmission power level is maintained at a nominal level with adequate frequency to allow new ATs to detect the AP base station and ensure alignment between awake periods of associated ATs.

15. The method of claim 14, further comprising, in response to a given one of the at least one AT being in an awake state, operating in a normal mode.

16. A wireless communication device, comprising:
    a backhaul interface for a communication backhaul in operative communication with a macro network;
    a transceiver module for communicating with at least one of (a) at least one access terminal (AT), (b) the macro network via the backhaul, and (c) at least one base station in operative communication with the macro network;
    at least one processor operatively coupled with the backhaul interface and the transceiver module; and
    a memory module operatively coupled with the at least one processor and comprising executable code for the at least one processor to:
    determine whether any ATs are present within at least one defined coverage area;
    in response to no ATs being within the at least one coverage area, place the device in a low power mode; and
    when the device is in the low power mode, instruct the transceiver module to vary a transmission power at which the transceiver module transmits on a synchronization channel, a pilot signal and a broadcast channel as a function of time, wherein a transmission power level is maintained at a nominal level with adequate frequency to allow new ATs to detect the base station and ensure alignment between awake periods of any of the new ATs that become associated with the device.

17. The device of claim 16, wherein the at least one coverage area comprises a femto coverage area of an AP base station.

18. The device of claim 16, wherein the at least one processor determines whether any ATs are present within the at least one coverage area by receiving mobility data regarding the at least one AT as determined by the macro network.

19. The device of claim 16, wherein the at least one coverage area comprises a macro coverage area of a macro base station of the macro network.

20. The device of claim 19, wherein the transceiver module receives a wake-up signal transmitted from the macro network.

21. The device of claim 20, wherein the wake-up signal is based at least in part on identification of at least one of a serving cell and a neighboring cell reported by the at least one AT.

22. The device of claim 20, wherein the wake-up signal is based at least in part on mobility data regarding the at least one AT as determined by the macro network.

23. The device of claim 20, wherein the device ceases to operate in the low power mode in response to receiving the wake-up signal.

24. The device of claim 20, wherein the at least one processor instructs the transceiver module to modify the transmission power in response to receiving the wake-up signal.

25. The device of claim 24, wherein the transceiver module increases the transmission power.

26. The device of claim 16, wherein the at least one base station comprises at least one of a macro base station and a neighboring AP base station.

27. The device of claim 16, wherein the at least one processor:
in response to the at least one AT being within the at least one coverage area, determines whether each of the at least one AT is an idle state; and
in response to each of the at least one AT being in the idle state, places the device in a second low power mode.

28. The device of claim 27, wherein the at least one processor, in response to a given one of the at least one AT being in an awake state, places the device in a normal mode.

29. The device of claim 16, wherein the at least one processor determines whether any ATs are present within the at least one coverage area by aggregating information regarding the at least one AT from a plurality of macro base stations of the macro network.

30. A wireless communication device, comprising:
a backhaul interface for a communication backhaul in operative communication with a macro network;
a transceiver module for communicating with at least one of (a) at least one access terminal (AT), (b) the macro network via the backhaul, and (c) at least one base station in operative communication with the macro network;
at least one processor operatively coupled with the backhaul interface and the transceiver module; and
a memory module operatively coupled with the at least one processor and comprising executable code for the at least one processor to:
determine whether each of at least one AT in at least one defined coverage area is an idle state;
in response to each of the at least one AT being in the idle state, place the device in a low power mode; and
when the device is in the low power mode, instruct the transceiver module to vary a transmission power at which the transceiver module transmits on a synchronization channel, a pilot signal and a broadcast channel as a function of time, wherein a transmission power level is maintained at a nominal level with adequate frequency to allow new ATs to detect the base station and ensure alignment between awake periods of associated ATs.

31. The device of claim 30, wherein the at least one processor, in response to a given one of the at least one AT being in an awake state, places the device in a normal mode.

32. A wireless communications apparatus, comprising:
means for determining whether any access terminals (ATs) are present within at least one defined coverage area;
means for entering a low power mode in response to no ATs being within the at least one coverage area; and
means for varying a transmission power at which the apparatus transmits on a synchronization channel, a pilot signal and a broadcast channel as a function of time when in the low power mode, wherein a transmission power level is maintained at a nominal level with adequate frequency to allow new ATs to detect a base station and ensure alignment between awake periods of any of the new ATs that become associated with the base station.

33. The apparatus of claim 32, wherein the at least one coverage area comprises a femto coverage area of an AP base station.

34. A wireless communications apparatus, comprising:
means for determining whether each of at least one access terminal (AT) in at least one defined coverage area is in an idle state;
means for entering a low power mode in response to each of the at least one AT being in the idle state; and
means for varying a transmission power at which the AP base station transmits on a synchronization channel, a pilot signal and a broadcast channel as a function of time when in the low power mode, wherein a transmission power level is maintained at a nominal level with adequate frequency to allow new ATs to detect a base station and ensure alignment between awake periods of associated ATs.

35. A computer program product, comprising:
a non-transitory computer-readable medium comprising:
code for causing a computer to determine whether any access terminals (ATs) are present within at least one defined coverage area;
code for causing a computer to, in response to no ATs being within the at least one coverage area, place an access point (AP) base station in a low power mode; and
code for causing a computer to, when the AP base station is in the low power mode, vary a transmission power at which a synchronization channel, a pilot signal and a broadcast channel is transmitted as a function of time, wherein a transmission power level is maintained at a nominal level with adequate frequency to allow new ATs to detect the AP base station and ensure alignment between awake periods of any of the new ATs that become associated with the AP base station.

36. The computer program product comprising a non-transitory computer-readable medium of claim 35, wherein the at least one coverage area comprises a femto coverage area of an AP base station.

37. A computer program product, comprising:
a non-transitory computer-readable medium comprising:
code for causing a computer to determine whether each of at least one access terminal (AT) in at least one defined coverage area is in an idle state;
code for causing a computer to place an access point (AP) base station in a low power mode in response to each of the at least one AT being in the idle state; and
code for causing a computer to, when the AP base station is in the low power mode, vary a transmission power at which a synchronization channel, a pilot signal and a broadcast channel is transmitted as a function of time, wherein a transmission power level is maintained at a nominal level with adequate frequency to allow new ATs to detect the AP base station and ensure alignment between awake periods of associated ATs.

* * * * *